United States Patent
Lo et al.

(10) Patent No.: US 11,165,746 B2
(45) Date of Patent: Nov. 2, 2021

(54) MULTICAST TRAFFIC IN VIRTUAL PRIVATE NETWORKS

(71) Applicant: Arista Networks, Inc., Santa Clara, CA (US)

(72) Inventors: Alton Lo, Santa Clara, CA (US); Prashant Srinivas, Santa Clara, CA (US); Rajesh Semwal, Santa Clara, CA (US); Santosh Kumar, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 77 days.

(21) Appl. No.: 16/579,208

(22) Filed: Sep. 23, 2019

(65) Prior Publication Data

US 2021/0092092 A1 Mar. 25, 2021

(51) Int. Cl.
| | |
|---|---|
| *H04L 12/18* | (2006.01) |
| *H04L 29/12* | (2006.01) |
| *H04L 12/743* | (2013.01) |
| *H04L 12/46* | (2006.01) |
| *H04L 12/715* | (2013.01) |
| *H04L 12/745* | (2013.01) |

(52) U.S. Cl.
CPC ........ *H04L 61/2069* (2013.01); *H04L 12/185* (2013.01); *H04L 12/4633* (2013.01); *H04L 12/4641* (2013.01); *H04L 45/64* (2013.01); *H04L 45/748* (2013.01); *H04L 45/7453* (2013.01)

(58) Field of Classification Search
CPC ............... H04L 61/2069; H04L 12/185; H04L 12/4633; H04L 12/4641; H04L 45/7453; H04L 45/748
See application file for complete search history.

(56) References Cited

U.S. PATENT DOCUMENTS

| | | | |
|---|---|---|---|
| 7,818,580 B2 * | 10/2010 | Bardsley | H04L 63/0892 713/182 |
| 2016/0285932 A1* | 9/2016 | Thyamagundalu | H04L 61/2069 |
| 2018/0006930 A1* | 1/2018 | Du | H04L 67/28 |

* cited by examiner

*Primary Examiner* — Wei Zhao
(74) *Attorney, Agent, or Firm* — Fountainhead Law Group P.C.

(57) ABSTRACT

In one embodiment, a method is provided. The method includes determining that a network device should use an underlay multicast group associated with an overlay multicast group for multicast traffic. The underlay multicast group carries multicast traffic for the overlay multicast group. The overlay multicast group is associated with a virtual private network. The method also includes determining an underlay multicast group address for the underlay multicast group. The overlay multicast group is associated with an overlay multicast group address. A first portion of the underlay multicast group address is a function of the overlay multicast group address. The method further includes forwarding one or more multicast packets to one or more multicast receivers via the underlay multicast group using the underlay multicast group address.

20 Claims, 8 Drawing Sheets

| Overlay Multicast Group Address | VRF Prefix | VRF Suffix | Underlay Multicast Group Address |
|---|---|---|---|
| 224.1.1.1 | 225.1.0.0/16 | 0.0.0.0/0 | 225.1.1.1 |
| 224.1.2.1 | 225.1.0.0/16 | 0.0.0.0/0 | 225.1.2.1 |
| 224.5.2.1 | 225.1.0.0/16 | 0.0.0.3/8 | 225.1.2.3 |
| 224.2.1.1 | 225.0.0.0/8 | 0.0.0.0/0 | 225.2.1.1 |
| 224.2.1.1 | 225.0.0.0/8 | 0.0.3.4/16 | 225.2.3.4 |

TABLE 500

505
510
515
520
525

MULTICAST TRAFFIC IN VIRTUAL PRIVATE NETWORKS

BACKGROUND

Networks may include various interconnected network devices (e.g., switches, routers, etc.) that may be used to communicate data. A network may implement, use, and/or support multicast or multicasting. Multicast (or multicasting) may be a mechanism or protocol in which a source of packets and/or data may send the packets to a group of destination or receiving devices by sending the packets to a single address (e.g., a multicast address), rather than sending copies of the packets to each receiver individually. Networks may also implement, use, and/or support data encapsulation. Data encapsulation may be a mechanism or protocol in which a first packet may be encapsulated within a second packet. This may allow for different logical or virtual networks to be created using the same set of network devices in a network.

SUMMARY

In some implementations, a method is provided. The method includes determining that a network device should use an underlay multicast group associated with an overlay multicast group for multicast traffic. The underlay multicast group carries multicast traffic for the overlay multicast group. The overlay multicast group is associated with a virtual private network. The method also includes determining an underlay multicast group address for the underlay multicast group. The overlay multicast group is associated with an overlay multicast group address. A first portion of the underlay multicast group address is a function of the overlay multicast group address. The method further includes forwarding one or more multicast packets to one or more multicast receivers via the underlay multicast group using the underlay multicast group address.

In some implementations, a network device is provided. The network device includes a memory to store data. The network device also includes a processing device coupled to the memory. The processing device to determine that the network device should use an underlay multicast group associated with an overlay multicast group for multicast traffic. The underlay multicast group carries multicast traffic for the overlay multicast group. The overlay multicast group is associated with a virtual private network. The processing device is further to determine an underlay multicast group address for the underlay multicast group. The overlay multicast group is associated with an overlay multicast group address. A first portion of the underlay multicast group address is a function of the overlay multicast group address. The processing device is further to forward one or more multicast packets to one or more multicast receivers via the underlay multicast group using the underlay multicast group address.

In some implementations, a non-transitory machine-readable medium is provided. The non-transitory machine-readable medium has executable instructions to cause one or more processing devices to perform a method. The method includes determining that a network device should use an underlay multicast group associated with an overlay multicast group for multicast traffic. The underlay multicast group carries multicast traffic for the overlay multicast group. The overlay multicast group is associated with a virtual private network. The method also includes determining an underlay multicast group address for the underlay multicast group. The overlay multicast group is associated with an overlay multicast group address. A first portion of the underlay multicast group address is a function of the overlay multicast group address. The method further includes forwarding one or more multicast packets to one or more multicast receivers via the underlay multicast group using the underlay multicast group address.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, a network may implement, use, and/or support multicast or multicasting (e.g., sending packets to a group of destinations or receiving devices by sending the packets to a single address, rather than sending copies of the packets to each receiver individually). Networks may also implement, use, and/or support data encapsulation (e.g., encapsulating a first packet may within a second packet) to create multiple logical/virtual networks (e.g., multiple VPNs). Overlay networks and underlay networks may be used along with data encapsulation to create the logical/virtual networks. An overlay network may be a virtual or logical network that is built or implemented on top of an underlay network (e.g., underlying network or underlying network infrastructure). Although the overlay network may use multicast to transmit data from the multicast sources, to the multicast receivers. However, the underlay network may not be able to transmit the data through the underlay network using multicast. This may result in a more inefficient transmission of data when compared to multicasting data through the underlay network.

The embodiments, implementations, and/or examples described herein provide a more efficient and/or simpler mechanism for allowing a large number of network devices to aware of a consistent mapping of overlay multicast groups to underlay multicast groups. Based on one or more of an overlay multicast group address, a VRF prefix, and a VRF suffix, each network device may be able to generate the same corresponding underlay multicast group address. This may allow a large number of network devices to determine underlay multicast group addresses which may be used to multicast data through the underlay network.

Figure 1:
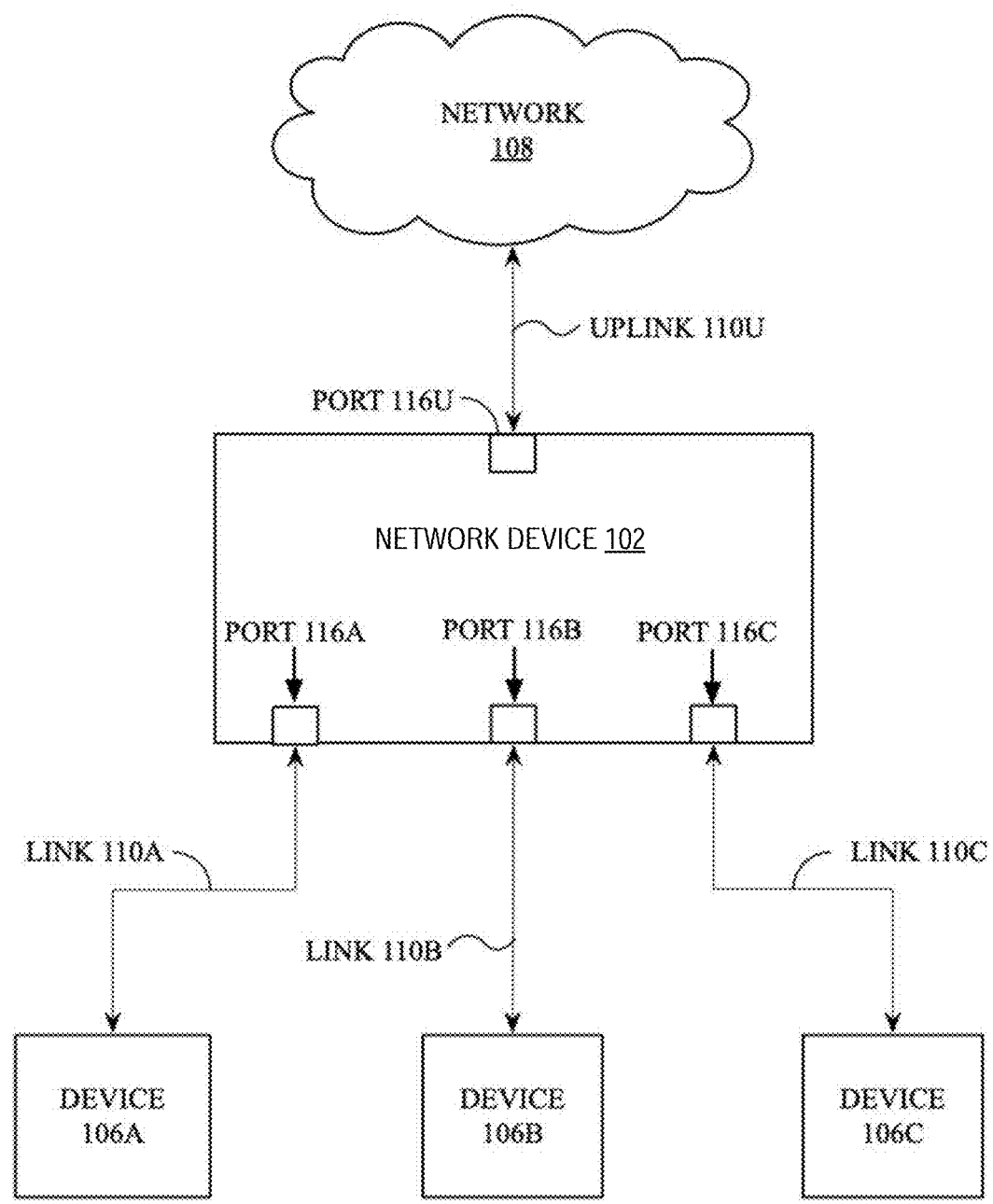
FIG. 1 is a block diagram of an example system that includes a network device communicating network data between a network and a number of devices, in accordance with some embodiments.

FIG. 1 is a block diagram of an example network system 100 that includes network device 102 communicating network data between a network 108 and a number of devices, illustrated for simplicity here as devices 106A-C, in accordance with some embodiments. Network device 102 will often have, for example, 24 ports, 48 ports, or more. In various embodiments, network device 102 is one or more of a switch, router, hub, bridge, gateway, etc., or any type of device that can provide access to a network 108 (e.g., physical network, virtualized network, etc.). In one embodiment, network device 102 couples to network 108 via uplink 110U coupled to uplink port 116U to provide network connectivity to devices 106A-C via respective links 110A-C coupled to ports 116A-C. Uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between network device 102 and devices 106A-C may also be wired connections. However, in some embodiments, links 110A-C are created over alternate connection types such as wireless connections or a combination of wired and wireless connections.

In one embodiment, devices 106A-C may be any type of device that can communicate network data with another device, such as a personal computer, laptop, or server. Devices 106A-C can also be a mobile device (e.g., phone, smartphone, personal gaming device, etc.), or another network device. In one embodiment, devices 106A-C can each be a virtual machine or can be a device that hosts one or more virtual machines. In one embodiment, network device 102 can also be a virtual machine.

In various embodiments, different types of protocols can be used to communicate network data over the various link connections (e.g., Ethernet, wireless, Synchronous Optical Networking (SONET), Fiber channel, Infiniband, etc.). The network data being communicated by network device 102 can be a stream of network frames, datagrams or data packets, or other types of discretely switched network data. As described herein, where individual elements of network data are referenced (e.g., frames, datagrams, or packets, etc.) the techniques described are applicable to any discretely switched network data form of network data. In one embodiment, network device 102 communicates network data between devices 106A-C and the network 108 or between devices 106A-C using a variety of communicating techniques (e.g., layer 2 switching, layer 3 routing, traffic shaping, applying a quality of service (QoS) policy, etc.).

In one embodiment, network device 102 is part of a region within a larger network topology, where devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over internet protocol network (VoIP), differing Quality of Service Parameters, or differing bandwidth limitations.

Each of links 110A-C and uplink 110U may have an associated physical link speed. A physical link speed may be a maximum throughput (e.g., a maximum data rate) for that link. The physical link speed for each link may be determined based upon the physics of the physical medium and the length of the link. In one embodiment, variability in latency generally occurs in a network device due to the processing time involved in buffering, queuing, processing and forwarding network data from a source port to a destination port in that network device.

Figure 2:
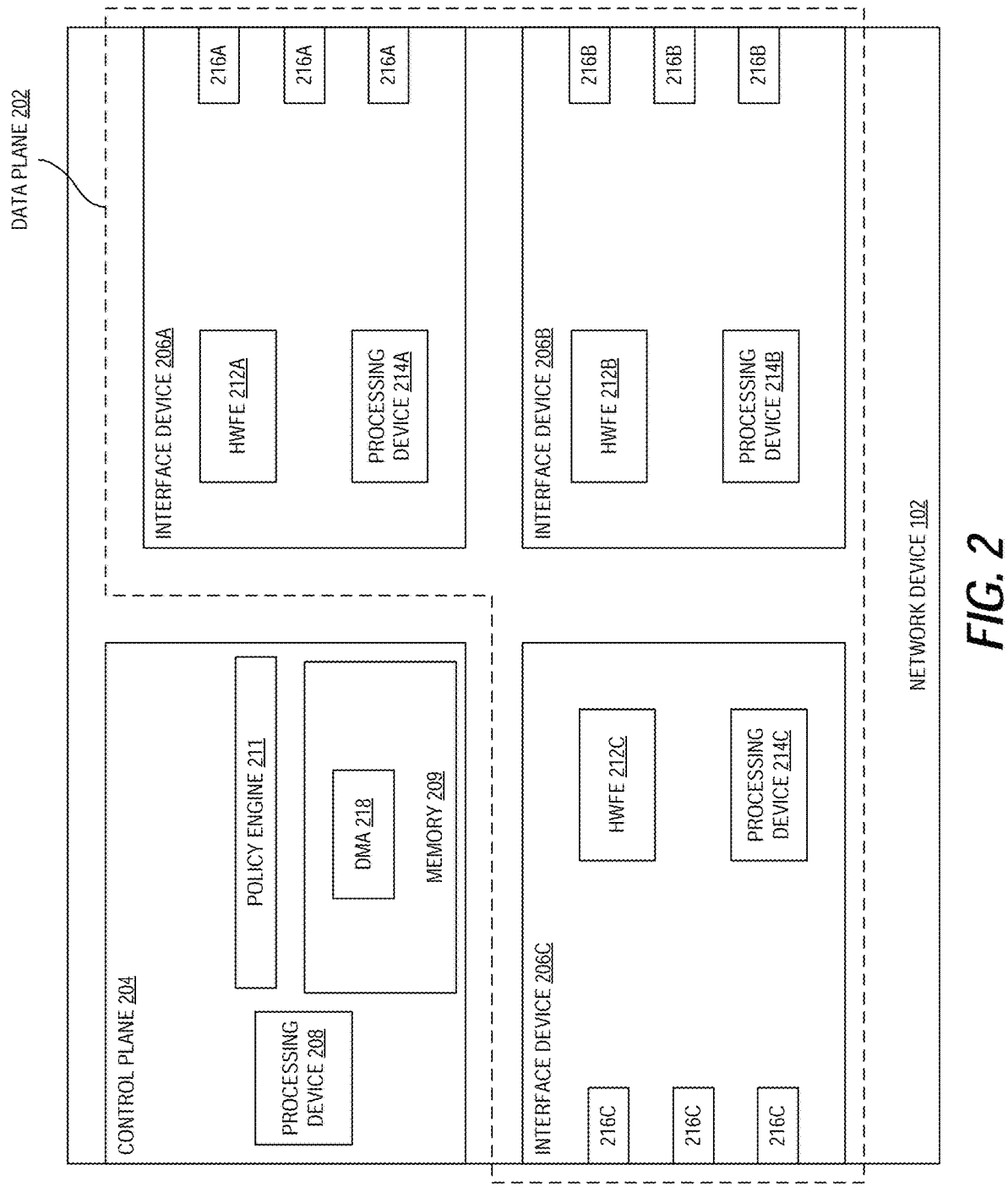
FIG. 2 is a block diagram of an example network device including a data plane coupled to a control plane and several interface devices, in accordance with some embodiments.

FIG. 2 is a block diagram of an example network device 102 that includes a data plane 202 coupled to a control plane 204 and several interface devices 206A-C, in accordance with some embodiments. In some network devices, data plane 202 is referred to as the forwarding plane. In one embodiment, the illustrated network device 102 is a variant of the network device 102 of FIG. 1. In one embodiment, control plane 204 includes central processing unit (CPU) 208 and memory 209 to store data. Processing device 208 is used to process information for control plane 204 and writes configuration data for hardware forwarding engines 212A-C in interface devices 206A-C. Additionally, processing device 208 can read data from the hardware forwarding engines 212A-C. In one embodiment, data plane 202 receives, processes, and forwards network data using various configuration data (e.g., forwarding, security, quality of service (QoS), and other network traffic processing information). Data plane 202 includes multiple network interface devices 206A-C (e.g., line cards, etc.) that can each receive, process, and/or forward network traffic. Each of interface devices 206A-C includes one or more ports 216A-C that are used to receive and transmit network data.

In one embodiment, for each received unit of network data, data plane 202 determines a destination address for the network data, looks up the requisite information for that destination in one or more tables stored in the data plane, and forwards the data out the proper outgoing interface, for example, one of interface devices 206A-C. In one embodiment, each interface device 206A-C includes one or more hardware forwarding engines (HWFE(s)) 212A-C, processing device 214A-C, and ports 216A-C, respectively. Each hardware forwarding engine 212A-C forwards data for the network device 102, performing routing, switching, or other types of network forwarding. Each processing device 214A-C can be used to accelerate various functions of interface devices 206A-C. For example, and in one embodiment, processing devices 214A-C can be configured to program corresponding hardware forwarding engines 212A-C. Processing devices 214A-C can also push data from hardware forwarding engines 212A-C to a processing device 208 in control plane 204.

In one embodiment, control plane 204 gathers the configuration data for hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to hardware forwarding engines 212A-C.

In one embodiment, the memory 209 that is used to store data for control plane 204 is shared with data plane 202. In such an embodiment, a direct memory access (DMA) controller 218 is coupled to memory 209 to allow processing devices 214A-C direct access to memory 209. In one embodiment, DMA controller 218 allows processing devices 214A-C to directly access the memory 209 without requiring processing device 208 in control plane 204 to send data to each processing device 214A-C. In one embodiment, control plane 204 includes a policy engine 211 to apply a QoS policy to network traffic flowing through network device 102. Policy engine 211 can be configured to minimize the latency of some type of network traffic, or to apply traffic shaping policies on the overall flow of traffic through the network device, or within a larger network topology. Proper determination of real-time latency data within the network can be key to the implementation of effective QoS policy. In one embodiment, logic to perform the timing of network data flow is consolidated into the hardware of data plane 202 of each network device 102.

Figure 3:
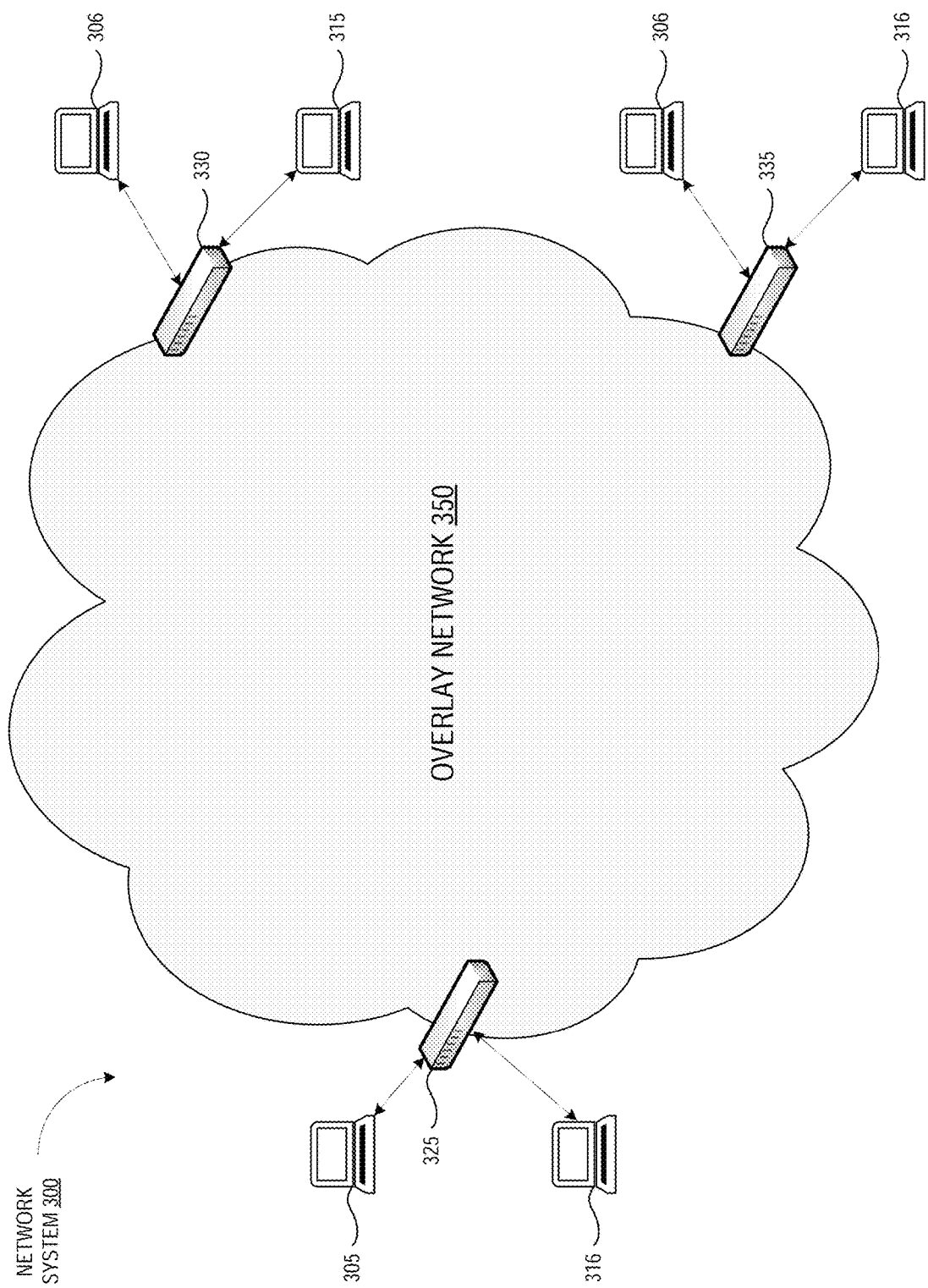
FIG. 3 is block diagram of an example network system, in accordance with some embodiments.

FIG. 3 is block diagram of an example network system 300, in accordance with some embodiments. The network system 300 includes multicast source 305, multicast receivers 306, multicast source 315, multicast receivers 316, network device 325, network device 330, network device 335, and overlay network 350. In one embodiment, the network system 300 may implement, use, and/or support multicast or multicasting. Multicast (or multicasting) may be a mechanism or protocol in which a source of packets and/or data (e.g., multicast sources 305 and 315) may send the packets to a group of destination or receiving devices by sending the packets to an address (e.g., a single address). The single address may be referred to as a multicast address, a multicast group address, etc. The packets transmitted by multicast sources 305 and 315 may be referred to as multicast packets, multicast traffic, multicast data, etc. Multicast sources 305 and 315 may be computing devices (e.g., a desktop computer, a laptop computer, a server, a tablet computer, a smartphone, a cellular phone, etc.) or network devices (e.g., a network switch, a network router, etc.) that transmit multicast traffic. For example, multicast sources 305 and/or 315 may be devices that transmit data or packets to a multicast address. The receivers of the multicast packets may be referred to as multicast receivers. Multicast receivers 306 and 316 may be computing devices and/or network devices that receive multicast traffic. For example, multicast receivers 306 and 316 may be devices that listen for data that is transmitted to a multicast address. The multicast address (e.g., a group address, a multicast group address, etc.) may be a logical identifier for the group destination or receiving devices.

In another embodiment, network system 300 may also implement, use, and/or support data encapsulation. Data encapsulation may be a mechanism or protocol in which a first packet may be encapsulated within a second packet. For example, the first packet may be the payload of the second packet and the second packet may include a different header and a different footer. The packet headers for the second header may include different fields and/or information. For example, the source and destination address in the first packet may be different from the source and destination address in a second header. In addition, the first packet may optionally be encrypted when the first packet is encapsulated. Data encapsulation may also be referred to as data tunneling.

Virtual private networks (VPNs) may use data encapsulation. A virtual private network may extend a private network across one or more other networks, such as public networks (e.g., the Internet). This may allow computing devices to communicate data across the one or more other networks, as if the computing devices were directly connected to the private network. The data transmitted by a first device may be encapsulated and/or encrypted and may be provided to a second device via the VPN. Thus, the VPN may establish a tunnel between the first device and the second device. There are various other encapsulation mechanisms, protocols, technologies, etc., that may be used to encapsulate data. Examples of encapsulation mechanisms, protocols, technologies, etc., include, but are not limited to, virtual extensible local area networks (VXLANs), generic routing encapsulation (GRE), virtual routing and forwarding (VRF), and IP-in-IP encapsulation (e.g., IPIP or IP-IP).

Data encapsulation and/or tunneling may allow for the construction of multiple independent networks operating using a given physical network (e.g., a set of network devices). The multiple independent networks may be referred to as overlay networks. An overlay network may be a virtual or logical network that is built or implemented on top of an underlying network or underlying network infrastructure. For example, the overlay network 350 may be a virtual network that is built upon an underlying network infrastructure that may include switches, routers, bridges, gateways, and/or other types of network devices that are capable of forwarding data, as discussed in more detail below. An overlay network may be referred to as a VPN, a VRF, a VXLAN, etc.

Each of the network devices 325, 330, and 335 may be physical devices (such as network switches, network routers, network gateways, network bridges, etc.) or may be virtual devices (such as virtual machines executing on a hypervisor or a container executing on a container manager). Network devices 325, 330, and 335 may be located at the edge of overlay network 350. Thus, network devices 325, 330, and/or 335 may be referred to as edge devices, edge routers, edge switches, etc. Network devices 325, 330, and/or 335 may be examples of network device 102 illustrated in FIGS. 1 and 2.

Overlay network 350 may not be aware of the encapsulation that is performed on data and/or packets. For example, devices that are coupled to overlay network 350 (e.g., multicast receivers 306 and 316) may deal with the payload of an encapsulated packet (e.g., another packet) and may be unaware that the payload was previously encapsulated. Overlay network 350 may be implemented on or built on an underlay network (e.g., overlay network 350 is associated with an underlay network). The underlay network may be physical infrastructure (e.g., one or more physical network devices) over which overlay network 350 is built or implemented. The underlay network may also be the network devices that transport data (e.g., packets, messages, frames, etc.) which are communicated (e.g., transmitted and/or received) by devices coupled to overlay network 350. An underlay network may be aware of the encapsulated packets but may be agnostic to the payload of the encapsulated packets. For example, the underlay network may not be interested in and/or may not look at the payload of an encapsulated packet to determine that the payload includes multicast traffic from the overlay network 350. The underlay network is discussed in more detail below.

Although overlay network 350 may use multicast to transmit data from the multicast sources 305 and 315, to the multicast receivers 306 and 316, the underlay network may not be able to transmit the data through the underlay network using multicast. For example, after a multicast packet is encapsulated, the underlay network may generally transmit the encapsulated packet through the underlay network using unicast, as discussed in more detail below. This may result in a more inefficient transmission of the multicast data because data may be unnecessarily duplicated in the underlay network.

Figure 4:
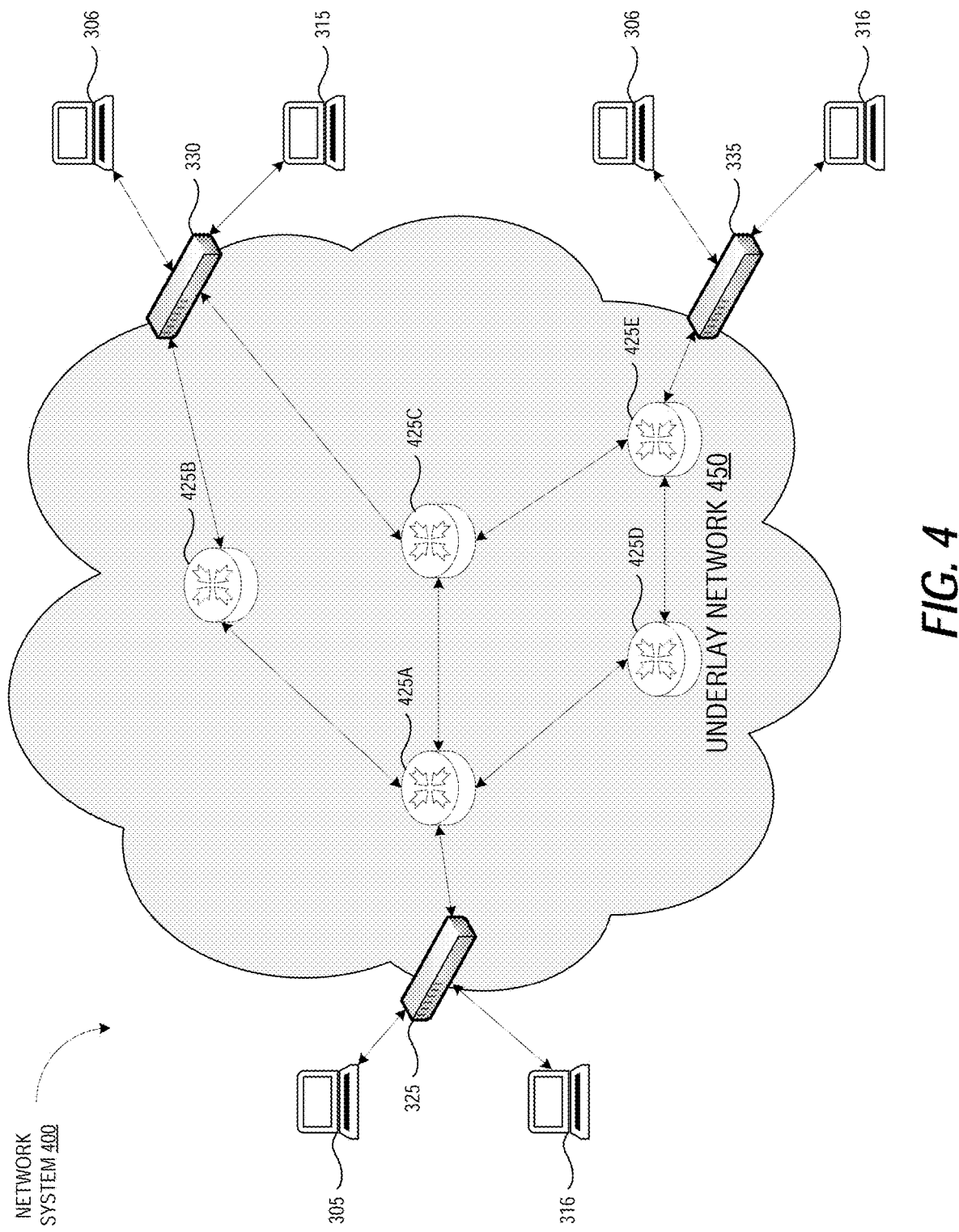
FIG. 4 is block diagram of an example network system, in accordance with some embodiments.

FIG. 4 is block diagram of an example network system 400, in accordance with some embodiments. The network system 400 includes multicast source 305, multicast receivers 306, multicast source 315, multicast receivers 316, network device 325, network device 330, network device 335, and underlay network 450. In one embodiment, the network system 400 may implement, use, and/or support multicast or multicasting. As discussed above, multicast (or multicasting) may be a mechanism or protocol in which multicast sources 305 and 315 may send multicast packets/data to multicast receivers 306 and 316 by sending the packets to a multicast address. The packets transmitted by multicast sources may be referred to as multicast packets, multicast traffic, multicast data, etc. The multicast address (e.g., a group address, a multicast group address, etc.) may be a logical identifier for the group destination or receiving devices. In another embodiment, network system 400 may also implement, use, and/or support data encapsulation. Data encapsulation may be a mechanism or protocol in which a first packet may be encapsulated within a second packet. VPNs, VXLANs, VRFs, etc., may use data encapsulation. Data encapsulation and/or tunneling may allow for the construction of multiple independent networks (e.g., multiple VPNs, multiple VRFs, etc.) using underlay network 450 (e.g., using the network devices 425A through 425E in underlay network 450). The multiple independent networks may be referred to as overlay networks. For example, the overlay network 350 illustrated in FIG. 3 may be a virtual network that is built upon network devices 425A through 425E. An overlay network may be referred to as a VPN, a VRF, a VXLAN, etc.

As discussed above, network devices 325, 330, and 335 may be physical and/or virtual devices that may be located at the edge of an overlay network. The network devices 325, 330, and 335 may also be located at the edge of underlay network 450. Thus, network devices 325, 330, and/or 335 may be referred to as edge devices, edge routers, edge switches, etc. Network devices 325, 330, and/or 335 may be examples of network device 102 illustrated in FIGS. 1 and 2.

In one embodiment, the network system 400 may include two VPNs. Each of the two VPNs includes network devices 325, 330, and 335. The network system 400 also includes two overlay multicast groups. The first overlay multicast group may be referred to as overlay multicast group A. Overlay multicast group A may be used to multicast data from multicast source 305 to multicast receivers 306. Overlay multicast group A may be associated with the first VPN. Overlay multicast group A may use underlay multicast group A to multicast data through the underlay network 450. Underlay multicast group A includes network devices 425A, 425C, 425D, and 425E. The second overlay multicast group may be referred to as overlay multicast group B. Overlay multicast group B may be used to multicast data from multicast source 315 to multicast receivers 316. Overlay multicast group B may be associated with the second VPN. Overlay multicast group B may use underlay multicast group B to multicast data through the underlay network 450. Underlay multicast group B includes network devices 425A, 425B, 425C, and 425E.

In one embodiment, a network device (e.g., a processing device of the network device) may determine that the network device should use an underlay multicast group associated with an overlay multicast group. For example, the processing device for network device 325 may determine that network device 325 should use underlay multicast group A (which includes network devices 425A, 425C, 425D, and 425E) to transmit multicast traffic from multicast source 305 to multicast receivers 306. In another example, the processing device for network work device 330 may determine that the network device 330 should use underlay multicast group B (which includes network devices 425A, 425B, 425C, and 425E) to transmit multicast traffic from multicast source 315 to multicast receivers 316.

In one embodiment, a network device (e.g., a processing device of the network device) may determine that the network device should use an underlay multicast group associated with an overlay multicast group when the network device receives a join request from a multicast receiver to join an overlay multicast group. For example, network device 330 may receive a join request from multicast receiver 306 to join the overlay multicast group A (which includes network devices 325, 330, and 335). In another example, network device 335 may receive a join request from multicast receiver 315 may receive a join request from multicast receiver 316 to join overlay multicast group A (which includes network devices 325, 330, and 335).

In one embodiment, a network device (e.g., a processing device of the network device) may determine that the network device should use an underlay multicast group associated with an overlay multicast group when the network device receiving a multicast packet transmitted to an overlay multicast group address. For example, network device 325 may receive multicast traffic for overlay multicast group A from multicast source 305. In another example, network device 330 may receive multicast traffic for overlay multicast group B from multicast source 315.

In one embodiment, a network device (e.g., a processing device of the network device) may determine an underlay multicast group address for an underlay multicast group. For example, network device 325 may determine an underlay multicast group address for the underlay multicast group A (which includes network devices 425A, 425C, 425D, and 425E). The network devices 425A, 425C, 425D, and 425E may perform multicast forwarding (e.g., may transmit multicast packets). In another example, network device 330 may determine an underlay multicast group address for underlay multicast group B (which includes network devices 425A, 425B, 425C, and 425E). The network devices 425A, 425B, 425C, and 425E may perform multicast forwarding. In a further example, one or more of the network devices 425A through 425E may determine an underlay multicast group address (e.g., determine the underlay multicast group address based on one or more of an overlay multicast group address, a VRF prefix, and a VRF suffix).

As discussed above, an underlay multicast group may be associated with an overlay multicast group. For example, the underlay multicast group A may be used to transmit the multicast traffic for overlay multicast group A, which is received from the multicast source 305. In another example, the underlay multicast group B may be used to transmit the multicast traffic for overlay multicast group B, which is received from the multicast source 315. An overlay multicast group may be associated with an overlay multicast group address. For example, to transmit multicast packets to overlay multicast group A, multicast source 305 may transmit the multicast packets to an overlay multicast group address for overlay multicast group A. An overlay multicast group address may also be associated with an underlay multicast group address. For example, overlay multicast group A (which is associated with a first overlay multicast group address) may be associated with underlay multicast group A (which is associated with a first underlay multicast group address). Thus, the first overlay multicast group address (for overlay multicast group A) is associated with first underlay multicast group address (for underlay multicast group A).

Figure 5:
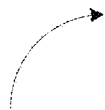
FIG. 5 is a table of example multicast addresses, in accordance with some embodiments.

In one embodiment, a portion of an underlay multicast group address may be a function of the associated overlay multicast group address. For example, the first portion of an underlay multicast group address may be determined based on the associated multicast group address. The network device may use and/or apply a function to portions (e.g., one or more bits, one or more octets, etc.) of the associated overlay multicast group address to determine (e.g., generate, calculate, etc.) the portion of the underlay multicast group address. For example, the network device may identify one or more octets from the associated overlay multicast group address (e.g., the last octet in an IP address). The network device may use the one or more octets in the portion of the underlay multicast group address, as illustrated in FIG. 5. In another example, the network device may generate a hash (e.g., a hash value) of a portion or all of the associated overlay multicast group address. For example, the network device may apply a hash function (or some other function, operation, etc.) to a portion or all of the associated overlay multicast group address to generate the hash. The hash may be used in the portion of the underlay multicast group address. For example, the hash value (or a portion of the hash value) may be inserted into the portion of the underlay multicast group address.

In one embodiment, a portion of the underlay multicast group address may be based on a VRF prefix that is associated with an overlay multicast group. For example, overlay multicast group A may be associated with one or more VRF prefixes. One or more octets (e.g., portions, fields, etc.) of the VRF prefix may be used in a portion of the underlay multicast group address. For example, one or more octets of the VRF prefix may be inserted into one or more octets of the underlay multicast group address, as illustrated in FIG. 5. In another example, a portion of an underlay multicast group address may be a function of the VRF prefix. The network device may use and/or apply a function to portions (e.g., one or more bits, one or more octets, etc.) of the VRF prefix. For example, the network device may generate a hash (e.g., a hash value) using and/or based on a portion or the entire VRF prefix. The hash generated from the VRF prefix may be used in the portion of the underlay multicast group address (rather than directly using the portion or the entire VRF prefix).

In one embodiment, a portion of the underlay multicast group address may be based on a VRF suffix that is associated with an overlay multicast group. For example, overlay multicast group A may be associated with one or more VRF suffixes. One or more octets (e.g., portions, fields, etc.) of the VRF suffix may be used in a portion of the underlay multicast group address. For example, one or more octets of the VRF suffix may be inserted into one or more octets of the underlay multicast group address, as illustrated in FIG. 5. In another example, a portion of an underlay multicast group address may be a function of the VRF suffix. The network device may use and/or apply a function to portions (e.g., one or more bits, one or more octets, etc.) of the VRF suffix. For example, the network device may generate a hash (e.g., a hash value) of a portion or the entire VRF suffix. The hash generated from the VRF suffix may be used in the portion of the underlay multicast group address.

In one embodiment, the network device (e.g., a processing device of the network device) may forward (e.g., transmit) one or more multicast packets to one or more multicast receivers via an underlay multicast group using an underlay multicast group address (that is generated based on the associated overlay multicast group address). For example, the network device may forward or transmit the multicast packets received from multicast source 305 via underlay multicast group A (which includes network devices 425A, 425C, 425D, and 425E). In another embodiment, network device may encapsulate the one or more multicast cast packets into one or more encapsulated packets. For example, network device 325 may include a multicast packet as the payload of an encapsulated packet. The encapsulated packet may include the underlay multicast group address (that is generated based on the associated overlay multicast group address) as the destination address. Network device 325 may forward the encapsulated packet to network device 425A (e.g., to the underlay multicast group A) which may multicast the encapsulated packet to the multicast receivers 306 via the network devices 425C, 425D, and 425E which are also part of the underlay multicast group A.

As discussed above, the overlay network may use multicast to transmit data from the multicast sources 305 and 315, to the multicast receivers 306 and 316. Generally, underlay networks may not be able to transmit the data through the underlay network using multicast. For example, after a multicast packet from multicast source 305 is encapsulated, underlay network 450 may generally transmit the encapsulated packet through the underlay network using unicast. Unicast may be a mechanism or protocol where data is transmitted from one source/sender to one receiver. For example, to transmit a multicast packet via the underlay network 450, the network device 325 may encapsulate the multicast packet into an encapsulated packet, and transmit two copies of the encapsulated packet to the network device 425A. Each of the network devices 425B through 425E may also replicate or copy the packets and forward them to adjacent network devices. This may result in a more inefficient transmission of data when compared to multicast. If multicast was used in the underlay network 450, one copy of the encapsulated packet would be transmitted to the network device 425A, rather than two copies.

A conventional underlay network may not be able to transmit the multicast data from the overlay network through the underlay network using multicast because it may be difficult to map overlay multicast groups (e.g., groups of network devices in an overlay network) to underlay multicast groups (e.g., groups of network devices in the underlay network) in a consistent manner. For example, for the underlay network 450 to properly transmit multicast data, each overlay multicast group may be mapped to a unique underlay multicast group. In addition, each network device (e.g., network devices 325, 330, and 335) should be aware of which unique underlay multicast group maps to a particular overlay multicast group. If a network includes tens of thousands, hundreds of thousands, etc., of network devices, configuring a mapping table (which indicates which overlay multicast groups map to which underlay multicast groups) may be a time consuming, inefficient, and/or difficult process. Thus, multicasting data from the overlay network through the underlay network 450 may be difficult because it may be difficult to ensure that a large number of network devices are aware of a consistent mapping of overlay multicast groups to underlay multicast groups.

The embodiments, implementations, and/or examples described herein provide a more efficient and/or simpler mechanism for allowing a large number of network devices to be aware of a consistent mapping of overlay multicast groups to underlay multicast groups. Based on one or more of an overlay multicast group address, a VRF prefix, and a VRF suffix, each network device may be able to generate the same corresponding underlay multicast group address. For example, each network device may be provided a table, a set of rules (e.g., one or more rules), etc., indicating which portions of one or more of the overlay multicast group address, a VRF prefix, and a VRF suffix should be used to determine a corresponding underlay multicast group address. If each network device is aware of the same set of rules, then each network device may determine the same corresponding underlay multicast group address, given an overlay multicast group address, a VRF prefix, and a VRF suffix. This may allow the underlay network 450 to multicast encapsulated data (e.g., encapsulated multicast data) through the underlay network 450, which results in a more efficient usage of network resources and/or network bandwidth.

FIG. 5 is a table 500 of example multicast addresses, in accordance with some embodiments. As discussed above, an underlay multicast group address may be determined based on one or more of an associated overlay multicast group address, a VRF prefix, and a VRF suffix. Table 500 illustrates various underlay multicast group addresses which may be generated based on associated overlay multicast group addresses, VRF prefixes, and VRF suffixes. The table 500 includes rows 505 through 525. Each of the rows 505 through 525 may indicate and/or represent rules that should be used to generate an underlay multicast group address.

Row 505 includes an overlay multicast group IPv4 address of 224.1.1.1, a VRF prefix of 225.1.0.0/16, and a VRF suffix of 0.0.0.0/0. The VRF prefix 225.1.0.0/16 may indicate that the first 16 bits of the VRF prefix of 225.1.0.0/16 should be used in the underlay multicast group address. Thus, the first octet 255 and the second octet 1 (e.g., the first 16 bits, as indicated by the underlined portions of the VRF prefix) are used as the first and second octets of the underlay multicast group address, respectively. The VRF suffix of 0.0.0.0/0 indicates that no portion of the VRF suffix should be used. The remaining octets of the underlay multicast group address in row 505 (e.g., the last two octets of the underlay multicast group address) may use octets from the overlay multicast group address (e.g., the last two octets of the overlay multicast group address) as indicated by the underlined portions of the overlay multicast group address. This results in an underlay multicast group address of 225.1.1.1.

Row 510 includes an overlay multicast group address of 224.1.2.1, a VRF prefix of 225.1.0.0/16, and a VRF suffix of 0.0.0.0/0. The VRF prefix of 225.1.0.0/16 may indicate that the first 16 bits of the VRF prefix 225.1.0.0/16 should be used in the underlay multicast group address. Thus, the first octet 255 and the second octet 1 (e.g., the first 16 bits, as indicated by the underlined portions of the VRF prefix) are used as the first and second octets of the underlay multicast group address, respectively. The VRF suffix of 0.0.0.0/0 indicates that no portion of the VRF suffix should be used. The remaining octets of the underlay multicast group address in row 510 (e.g., the last two octets of the underlay multicast group address) may use octets from the overlay multicast group address (e.g., the last two octets of the overlay multicast group address) as indicated by the underlined portions of the overlay multicast group address. This results in an underlay multicast group address of 225.1.2.1.

Row 515 includes an overlay multicast group address of 224.5.2.1, a VRF prefix of 225.1.0.0/16, and a VRF suffix of 0.0.0.3/8. The VRF prefix of 225.1.0.0/16 may indicate that the first 16 bits of the VRF prefix 225.1.0.0/16 should be used in the underlay multicast group address. The first octet 255 and the second octet 1 (e.g., the first 16 bits, as indicated by the underlined portions of the VRF prefix) are used as the first and second octets of the underlay multicast group address, respectively. The VRF suffix of 0.0.0.3/8 indicates that the last octet of the VRF suffix should be used in the underlay multicast address. The last octet 3 (e.g., the last 8 bits, as indicated by the underlined portion of the VRF suffix) is used last octet of the underlay multicast group address. The remaining octet (e.g., the third octet) of the underlay multicast group address in row 515 may be the third octet from the overlay multicast group address (e.g., 2) as indicated by the underlined portion of the overlay multicast group address. This results in an underlay multicast group address of 225.1.2.3.

Row 520 includes an overlay multicast group address of 224.2.1.1, a VRF prefix of 225.0.0.0/8, and a VRF suffix of 0.0.0.0/0. The VRF prefix 225.0.0.0/8 may indicate that the first 8 bits of the VRF prefix 225.0.0.0/8 should be used in the underlay multicast group address. Thus, the first octet 255 (e.g., the first 8 bits, as indicated by the underlined portion of the VRF prefix) are used as the first octet of the underlay multicast group address. The VRF suffix of 0.0.0.0/0 indicates that no portion of the VRF suffix should be used. The remaining octets of the underlay multicast group address in row 520 (e.g., the last three octets of the underlay multicast group address) may use octets from the overlay multicast group address (e.g., the last three octets of the overlay multicast group address) as indicated by the underlined portions of the overlay multicast group address. This results in an underlay multicast group address of 225.2.1.1.

Row 525 includes an overlay multicast group address of 224.2.1.1, a VRF prefix of 225.0.0.0/8, and a VRF suffix of 0.0.3.4/16. The VRF prefix of 225.0.0.0/8 may indicate that the first 8 bits of the VRF prefix 225.0.0.0/8 should be used in the underlay multicast group address. The first octet 255 (e.g., the first 8 bits, as indicated by the underlined portions of the VRF prefix) are used as the first octet of the underlay multicast group address. The VRF suffix of 0.0.3.4/16 indicates that the last two octets of the VRF suffix should be used in the underlay multicast address. The last two octets 3 and 4 (e.g., the last 16 bits, as indicated by the underlined portions of the VRF suffix) are used as the last two octets of the underlay multicast group address, respectively. The remaining octet (e.g., the second octet) of the underlay multicast group address in row 525 may be the second octet from the overlay multicast group address (e.g., 2) as indicated by the underlined portion of the overlay multicast group address. This results in an underlay multicast group address of 225.2.3.4.

In some embodiments, table 500 may be received from a user (e.g., a network administrator) that may be configuring or setting up a network device. For example, the user may provide the address, prefixes, and suffixes via a command line interface (CLI), a graphical user interface, etc. In another example, the user may provide a configuration file that may include the table 500. In other embodiments, the overlay multicast group addresses, the VRF prefixes, and the VRF suffixes may be determined, selected, etc., such that the combination of the portions of the overlay multicast group addresses, the VRF prefixes, and the VRF suffixes results in unique underlay multicast group addresses. For example, the overlay multicast group addresses, the VRF prefixes, and the VRF suffixes may be determined, selected, etc., such that each VPN has a unique VRF prefix. This may prevent traffic for devices in a first VPN from being delivered to devices in a second VPN. In further embodiments, multiple overlay groups may be mapped to the same underlay group. For example, the same set of network devices may be used to deliver multicast traffic for different overlay groups.

Although IPv4 address prefixes, and/or suffixes are illustrated in FIG. 5 and discussed herein, other types of address, prefixes, and/or suffixes may be used in other embodiments. For example, IPv6 addresses, IPv6 prefixes, and/or IPv6 suffixes may be used in other embodiments. Different portions of the IPv6 addresses, IPv6 prefixes, and/or IPv6 suffixes may be used to generate an underlay multicast group address.

Figure 6:
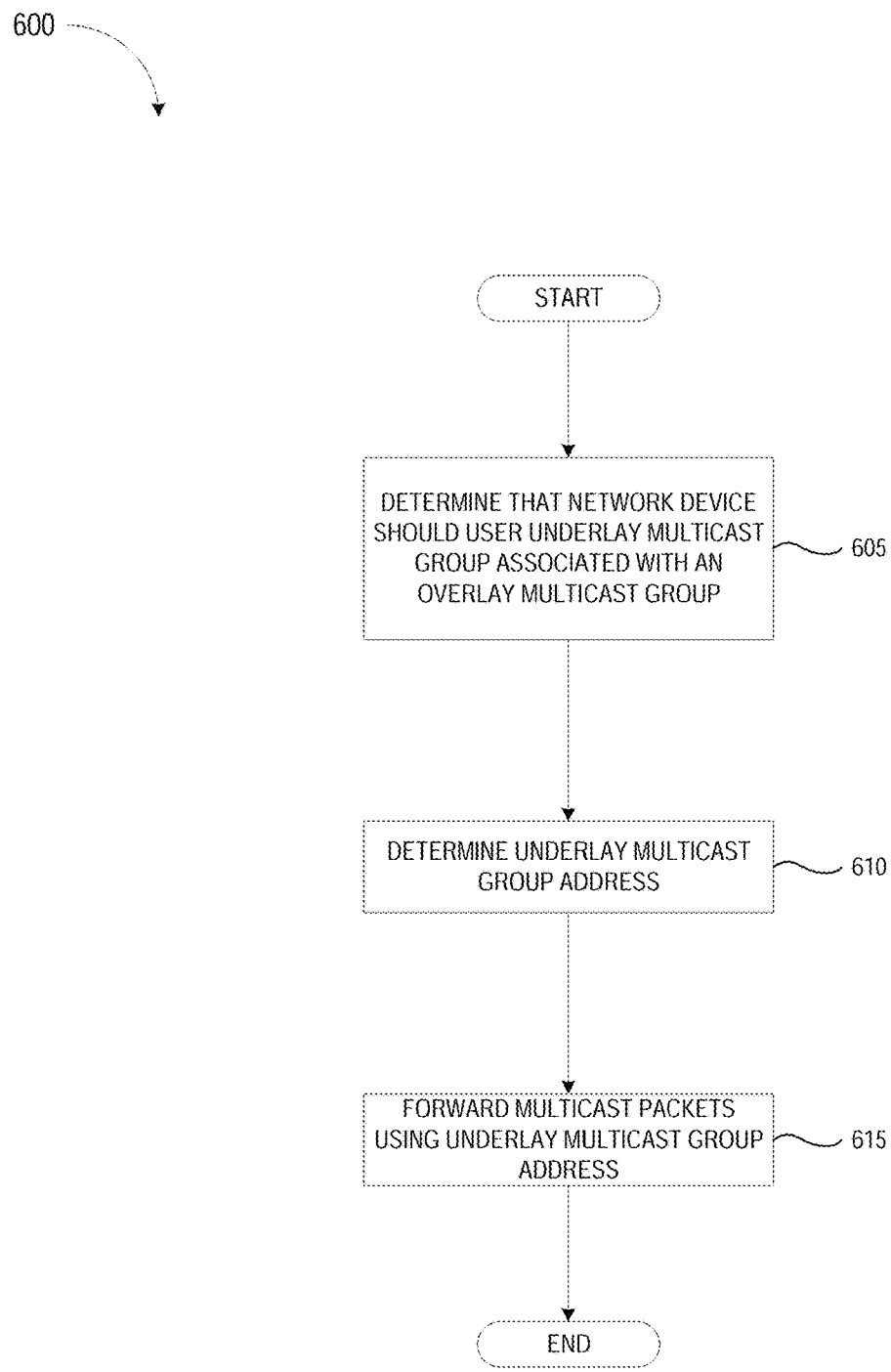
FIG. 6 is a flow diagram of a method for transmitting multicast data in a virtual private network (VPN), in accordance with some embodiments of the present disclosure.

FIG. 6 is a flow diagram of a method for transmitting multicast data in a virtual private network (VPN), in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), an ASIC, and FPGA, etc.), software (e.g., instructions running/executing on a processing device), firmware (e.g., microcode), or a combination thereof. In some embodiments, method 600 may be performed by a network device (e.g., network devices 325, 330, 335 illustrated in FIG. 4) or a processing device (e.g., processing device 208 illustrated in FIG. 2). It should be appreciated that the actions of method 600 in FIG. 6 can be performed in differing orders, groupings, or subsets than shown in FIG. 6, for various purposes or user preferences.

Method 600 begins at block 605 where the network device determines that the network device should use an underlay multicast group associated with an overlay multicast group for multicast traffic. As discussed above, the underlay multicast group may carry the multicast traffic (e.g., multicast packets) for the overlay multicast group. The network device may determine that the network device should use the underlay multicast group when a join request is received or if multicast packets/data are received, as discussed above. At block 610, the network device may determine an underlay multicast group address for the underlay multicast group. At least a portion of the underlay multicast group address may be a function of the overlay multicast group address. For example, the network device may use one or more of the overlay multicast group address for the overlay multicast group, a VRF suffix, and a VRF prefix to determine (e.g., generate, obtain, calculate, etc.) the underlay multicast group address. The network device may use different portions (e.g., different octets) of the overlay multicast group, the VRF suffix, and the VRF prefix in the overlay multicast group address, as discussed above. At block 615, the network device may forward one or more multicast packets to one or more multicast receivers via the underlay multicast group using the underlay multicast group address. For example, the network device may encapsulate the multicast traffic into an encapsulated packet and may use the underlay multicast group address as the destination address. This may allow the network device to multicast the encapsulated packet and/or transmit the encapsulated packet more efficiently.

Figure 7:
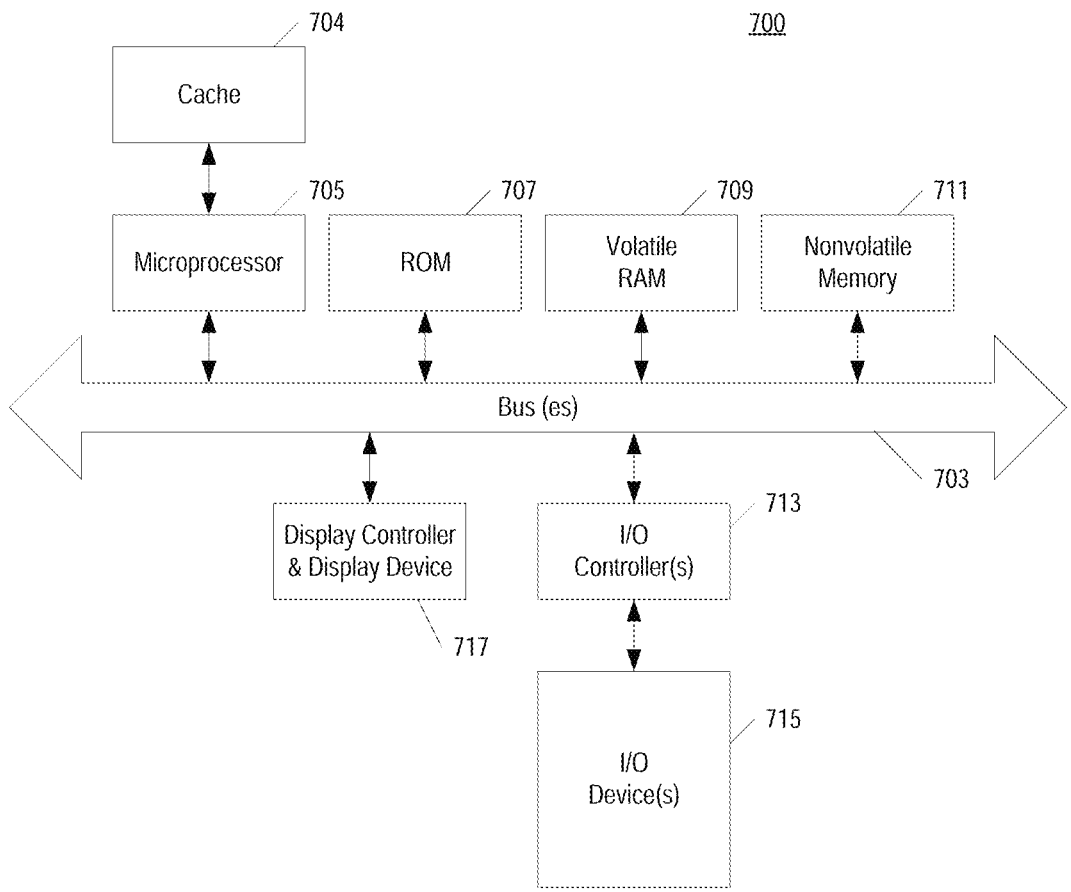
FIG. 7 shows an example a computing device, in accordance with some embodiments.

FIG. 7 shows an example computing device 700, in accordance with some embodiments. For example, the computing device 700 may be implemented including a network device 100 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computing device 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. In one embodiment, the computing device 700 includes a plurality of network interfaces of the same or different type (e.g., Ethernet copper interface, Ethernet fiber interfaces, wireless, and/or other types of network interfaces). In this embodiment, the computing device 700 can include a forwarding engine to forward network data received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
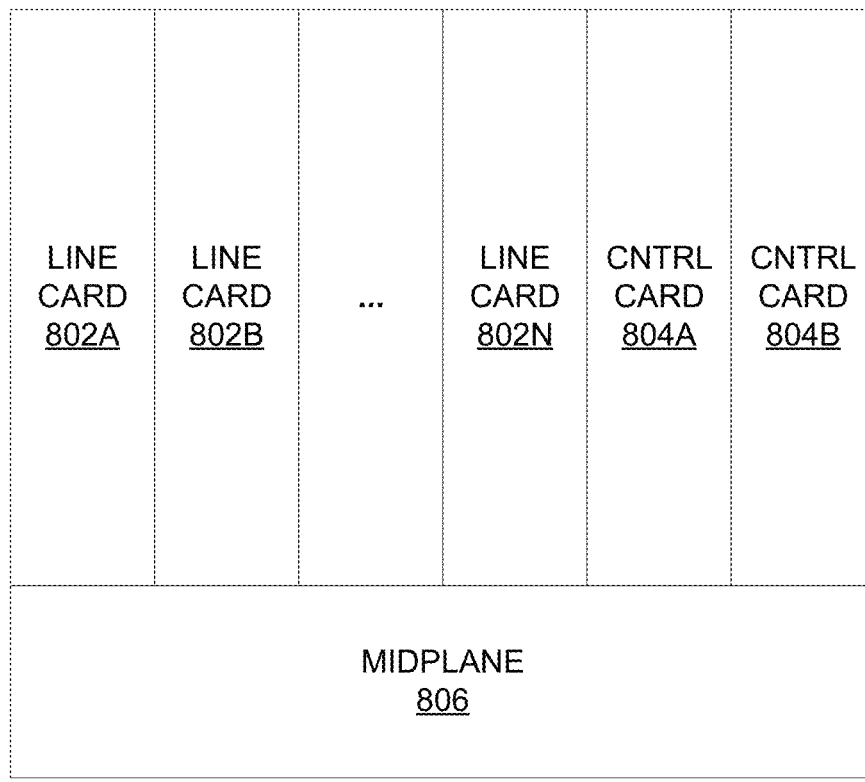
FIG. 8 is a block diagram of one embodiment of an exemplary network device, in accordance with some embodiments.

FIG. 8 is a block diagram of one embodiment of exemplary network device 800, in accordance with some embodiments. In FIG. 8, the midplane 808 couples to the line cards 802A-N and controller cards 804A-B. The midplane 808 may also be referred to as a fabric. While in one embodiment, the controller cards 804A-B control the processing of the traffic by the line cards 802A-N, in alternate embodiments, the controller cards 804A-B, perform the same and/or different functions (e.g., updating a software image on the network device, etc.). In one embodiment, the line cards 802A-N process and forward traffic according to the network policies received from the controller cards 804A-B. In one embodiment, the controller cards 804A-B may include containers, operating systems, and/or agents, as discussed above. It should be understood that the architecture of network device 800 illustrated in FIG. 8 is exemplary, and different combinations of cards may be used in other embodiments.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two blocks in a figure shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    determining that a network device should use an underlay multicast group associated with an overlay multicast group for multicast traffic, wherein:
        the underlay multicast group carries the multicast traffic for the overlay multicast group;
    determining an underlay multicast group address for the underlay multicast group, wherein:
        the overlay multicast group is associated with an overlay multicast group address; and
        a first portion of the underlay multicast group address is a function of the overlay multicast group address; and
    forwarding one or more multicast packets to one or more multicast receivers via the underlay multicast group using the underlay multicast group address.

2. The method of claim 1, wherein determining the underlay multicast group address comprises:
    identifying one or more octets from the overlay multicast group address; and
    using the one or more octets from the overlay multicast group address in the first portion of the underlay multicast group address.

3. The method of claim 1, wherein determining the underlay multicast group address comprises:
    generating a hash of the overlay multicast group address based on a hash function; and
    using at least a portion of the hash in the first portion of the underlay multicast group address.

4. The method of claim 1, wherein a second portion of the underlay multicast group address is based on a virtual routing and forwarding prefix associated with the overlay multicast group.

5. The method of claim 4, wherein the second portion of the underlay multicast group address comprises one or more octets of the virtual routing and forwarding prefix.

6. The method of claim 4, wherein a third portion of the underlay multicast group address is further based on a virtual routing and forwarding suffix associated with the overlay multicast group.

7. The method of claim 6, wherein the third portion of the underlay multicast group address comprises one or more octets of the virtual routing and forwarding suffix.

8. The method of claim 1, wherein determining that the network device should use the underlay multicast group comprises:
    receiving a join request from a multicast receiver to join the overlay multicast group.

9. The method of claim 1, wherein determining that the network device should use the underlay multicast group comprises:
    receiving a multicast packet transmitted to the overlay multicast group address.

10. The method of claim 1, wherein forwarding the one or more multicast packets to the one or more multicast receivers comprises:
    encapsulating a first multicast packet in a second packet, wherein a destination address of the second packet comprises the underlay multicast group address; and
    forwarding the second packet to a second network device.

11. A network device, comprising:
    a memory to store data; and
    a processing device coupled to the memory, the processing device configured to:
        determine that the network device should use an underlay multicast group associated with an overlay multicast group for multicast traffic, wherein:
            the underlay multicast group carries the multicast traffic for the overlay multicast group;
        determine an underlay multicast group address for the underlay multicast group, wherein:
            the overlay multicast group is associated with an overlay multicast group address; and
            a first portion of the underlay multicast group address is a function of the overlay multicast group address; and
        forward one or more multicast packets to one or more multicast receivers via the underlay multicast group using the underlay multicast group address.

12. The network device of claim 11, wherein to determine the underlay multicast group address the processing device is further to:
    identify one or more octets from the overlay multicast group address; and use the one or more octets from the overlay multicast group address in the first portion of the underlay multicast group address.

13. The network device of claim 11, wherein to determine the underlay multicast group address the processing device is further to:
generate a hash of the overlay multicast group address based on a hash function; and
use at least a portion of the hash in the first portion of the underlay multicast group address.

14. The network device of claim 11, wherein a second portion of the underlay multicast group address is based on a virtual routing and forwarding prefix associated with the overlay multicast group.

15. The network device of claim 14, wherein the second portion of the underlay multicast group address comprises one or more octets of the virtual routing and forwarding prefix.

16. The network device of claim 14, wherein a third portion of the underlay multicast group address is further based on a virtual routing and forwarding suffix associated with the overlay multicast group.

17. The network device of claim 16, wherein the third portion of the underlay multicast group address comprises one or more octets of the virtual routing and forwarding suffix.

18. The network device of claim 11, wherein to determine that the network device should use the underlay multicast group the processing device is further to:
receive a join request from a multicast receiver to join the overlay multicast group.

19. The network device of claim 11, wherein to determine that the network device should use the underlay multicast group the processing device is further to:
receive a multicast packet transmitted to the overlay multicast group address.

20. A non-transitory machine-readable medium having executable instructions to cause one or more processing devices to perform a method comprising:
determining that a network device should use an underlay multicast group associated with an overlay multicast group for multicast traffic, wherein:
the underlay multicast group carries the multicast traffic for the overlay multicast group;
determining an underlay multicast group address for the underlay multicast group, wherein:
the overlay multicast group is associated with an overlay multicast group address; and
a first portion of the underlay multicast group address is a function of the overlay multicast group address; and
forwarding one or more multicast packets to one or more multicast receivers via the underlay multicast group using the underlay multicast group address.

* * * * *